United States Patent
Sano et al.

[11] Patent Number: 6,064,391
[45] Date of Patent: May 16, 2000

[54] METHOD FOR DISPLAYING REGION EXTRACTING PROCESSING IN AN IMAGE PROCESSING SYSTEM

[75] Inventors: Koichi Sano, Yokohama; Hiroyuki Sekiguchi, Kawasaki; Tetsuo Yokoyama, Tokyo, all of Japan

[73] Assignee: Hitachi, Ltd., Tokyo, Japan

[21] Appl. No.: 07/797,893

[22] Filed: Nov. 26, 1991

[30] Foreign Application Priority Data

Nov. 28, 1990 [JP] Japan .................................. 2-322966

[51] Int. Cl.⁷ ...................................................... G06T 7/60
[52] U.S. Cl. ........................... 345/424; 382/128; 382/173; 382/190
[58] Field of Search ..................... 395/119, 161, 395/141, 124; 382/9, 16, 26, 173, 128, 131, 190; 364/413.16, 413.22, 413.19; 345/419, 441, 424

[56] References Cited

U.S. PATENT DOCUMENTS

| | | | |
|---|---|---|---|
| 4,879,668 | 11/1989 | Cline et al. | 395/124 |
| 4,903,202 | 2/1990 | Crawford | 382/16 X |
| 4,905,148 | 2/1990 | Crawford | 382/16 X |

FOREIGN PATENT DOCUMENTS 3-140140   6/1991   Japan .

OTHER PUBLICATIONS

Nikkei Computer Graphics, Dec. 1988, pp. 152–163.

Robb et al, "Interactive Display and Analysis of 3–D Medical Images", IEEE Trans. on Medical Imaging, vol. 8, No. 3, pp. 217–226, 1989.

Levin et al., "Surface of the Brain: Three–Dimensional MR Images Created with Volume Rendering", Radiology, Apr. 1989, pp. 277–280.

Bomans et al, "3–D Segmentation of MR Images of the Head for 3–D Display", IEEE Trans. on Medical Imaging, vol. 9, No. 2, Jun. 1990, pp. 177–183.

*Primary Examiner*—Mark K. Zimmerman
*Attorney, Agent, or Firm*—Antonelli, Terry, Stout & Kraus, LLP

[57] ABSTRACT

To efficiently, 3-dimensionally, perspectively project and display the extracting processing procedure of a predetermined region on a 3-dimensional image, the extracting process is executed while observing the displayed image. Further, the process is interrupted as necessary so that the process can progress or be returned. The result of the extraction at the interruption time point is edited on a 2-dimensional image and the result of the edition is immediately reflected onto the 3-dimensional image, so that whether the edition is proper or improper can be decided.

9 Claims, 7 Drawing Sheets

METHOD FOR DISPLAYING REGION EXTRACTING PROCESSING IN AN IMAGE PROCESSING SYSTEM

BACKGROUND OF THE INVENTION

The invention relates to an apparatus for three-dimensionally displaying an image by using voxel data obtained on a three-dimensional space and, more particularly, to a 3-dimensional image processing method which is effective in a 3-dimensional displaying apparatus using 3-dimensional data from a plurality of cross-sectional images scanned by a medical diagnosing apparatus (MRI, X-ray CT) for obtaining cross-sectional images.

The following prior art references 1) to 6) are well-known techniques related to the present invention.

1) "Nikkei Computer Graphics", December, 1988, pages 152 to 163.

2) "IEEE Trans. on Medical Imaging", Vol. 8, No. 3, pages 217 to 226, 1989.

3) "Radiology", April, 1989, pages 277 to 280.

4) "IEEE. Trans. on Medical Imaging", Vol. 9, No. 2, pages 178 to 183, 1990.

5) Azriel Rosenfeld, "Digital Picture Processing", translated by Makoto Nagao, pages 334 to 335.

6) JP-A-3-140140.

Three-dimensional image data (hereinafter, also referred to as 3-dimensional image data or 3D image data) is expressed by a set of small cubes called voxels. In the case of a two-dimensional (2-dimensional or 2D) image data, by directly displaying such 2D image data on a CRT, the 2D image can be seen by the human eyes. On the other hand, in the case of a 3D image, it is necessary to project the 3D image to 2D data in some format and to convert it into a form such that it can be viewed three-dimensionally. Such a process requires a perspective projection to convert a 3D image data into a 2D image, a hidden surface to eliminate the hidden portions which cannot be seen, and a shading to shade an image in order to obtain a stereoscopic feeling. Such a technique has been developed in the computer graphics (CG) field. In the medical 3-dimensional displaying process, the CG technique is conventionally used in the beginning. However, the conventional CG technique is not suitable for displaying a natural substance such as a human body. Such a CG technique has been developed as a method called a volume rendering.

The volume rendering methods are discussed in detail in the prior art reference 1) and 2).

It is an outline of those volume rendering methods that a boundary surface of an object to be displayed is not extracted but, on the basis of values in respective voxels, when the voxels are detected as a micro surface (voxel surface) on a 3-dimensional space, the light reflected by each voxel is obtained from the inclination of the surface and the light transmitted in the preceding voxel, and a 3D image is displayed as a sum of the reflected lights.

Figure 4:
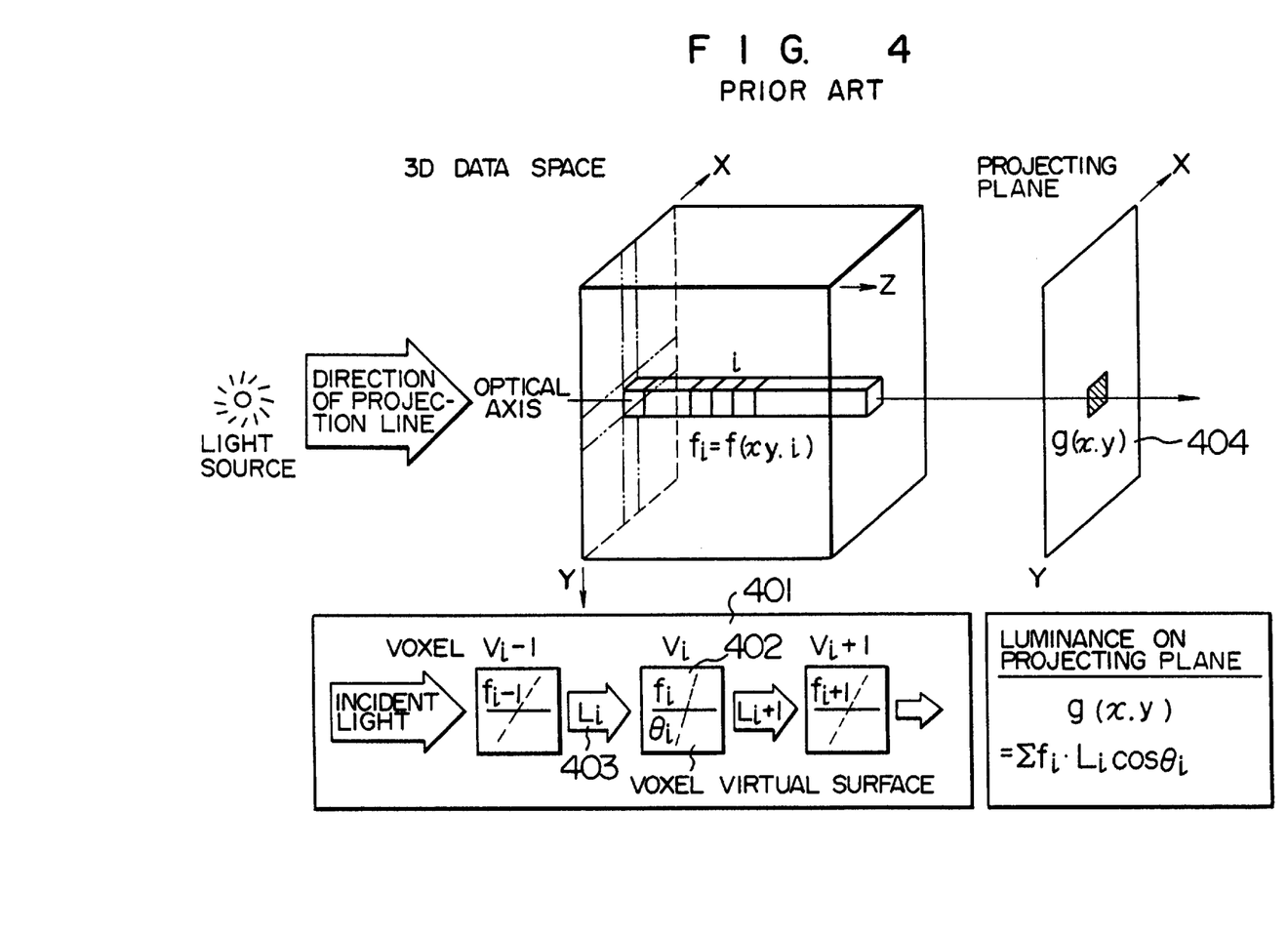
FIG. 4 is a diagram showing the outline of the volume rendering which is executed on 3-dimensional data.

The example of the above method will now be practically explained with reference to FIG. 4.

It is now assumed that the ith voxel 401 on a projection line is set to $V_i$, a voxel value 402 normalized to values from 0 to 1 for $V_i$ is set to $f_i$, and an incident light 403 to the voxel $V_i$ is set to $L_i$. When the incident light to the voxel $V_i$ passes in the voxel, it is reflected in accordance with the voxel value $f_i$ and is attenuated. The relation between the incident light $L_i$ to the voxel $V_i$ and a transmitted light $L_{i+1}$ is expressed by the following equation.

$$L_{i+1} = L_i(1-k(f_i)) \tag{1}$$

where, k is a function showing an attenuation factor of the voxel.

Picture quality changes in dependence on the setting of such a function. It is now assumed that the attenuation ratio of the voxel is proportional to the voxel value as a simple model. A region whose value is equal to or larger than a predetermined value $\beta$ is considered to be a complete boundary, so that no light is transmitted. On the other hand, since the light is attenuated by noises existing in front of the portion which is three-dimensionally displayed, a noise cut level $\alpha$ is set in order to avoid such a problem. The above points are summarized by the following equations.

$$k(f_i) = \begin{cases} 1 & f_i \leq \beta \\ 0 & f_i \leq \alpha \\ (f_i - \beta)/(\alpha - \beta) & \text{otherwise} \end{cases} \tag{2}$$

As will be obviously understood from the equation (1), the value of incident light $L_i$ is large on the surface of the object and is attenuated as the light progresses into the object. The value $\Sigma\{L_i \cdot f_i\}$ in which the products $L_i \cdot f_i$ of the incident light and the voxel values are accumulated with respect to all of the voxels on the projection line is the projection data to which the voxels of the object surface are reflected. The shading is performed by applying a weight to the product term $L_i \cdot f_i$ in the above equation in accordance with an angle which is defined by the incident light and the voxel surface. The voxel surface denotes a surface in which the voxels are regarded as one micro plane. A calculating method for the inclination of the voxel surface which is generally used is a method called gray-level gradients. In the above method, the gradients among the values of the adjacent voxels in three directions on a 3-dimensional space are used as a spatial gradient of the voxels. A vector gray-level gradient normalized to values from −1 to 1 is expressed by the following equation.

$$N_i = \nabla f_i / |\nabla f_i| \tag{3}$$

where, $$\nabla f_i = (\{f(x_{i+1}, y_i, z_i) - f(x_{i-1}, y_i, z_i)\},$$
$$\{f(x_i, y_{i+1}, z_i) - f(x_i, y_{i-1}, z_i)\},$$
$$\{f(x_i, y_i, z_{i+1}) - f(x_i, y_i, z_{i-1})\}$$

The case where the light enters from the same direction as the projection line direction will now be considered. In such a case, since it is sufficient to consider only the z direction, $N_i$ is simply expressed by the following equation.

$$N = \frac{f(x_i, y_i, z_{i+1}) - f(x_i, y_i, z_{i-1})}{|\nabla f_i|} = \cos\theta_i \tag{4}$$

From the above equation, a luminance g(x, y) on a projecting surface 404 is expressed by the following equation.

$$g(x, y) = \Sigma\{f_i \cdot f_i \cdot \cos\theta_i\} \tag{5}$$

On the other hand, a method for calculating only one voxel on the surface extracted is called a surface rendering.

In any of the above rendering methods, in order to three-dimensionally display a designated organ existing inside of the body surface, it is necessary to extract the organ from the 3D voxel data. A method of automatically extracting the organ, however, has not yet established. To derive the accurate data, it does not help to use a method for manually inputting the outline of the organ every slice image. Since the required amount of three-dimensional data is extremely large, such an extraction of the organ by an operator is not practical in the clinical field where a real-time execution is required.

As region extracting methods which have been proposed to solve the above problem, the following two typical methods are known.

① Method of extracting the outline of the designated region

② Method of extracting region including the voxels in the designates region

The method of ① is discussed in, for example, the prior art references 3) and 4) and is a method of extracting the outline of an organ by referring to a local value difference of the image. Hitherto, such a method has frequently been used for a medical image process.

The method ② is discussed in the prior art reference.

5). One point in a region is first selected, points connected to the above point are sequentially searched from the adjacent voxels, and the region is expanded so as to include those connected points, thereby extracting the interest region. Such a method is generally called a Region Growing. A global gray-level condition such as a value difference between the average value of the whole region and each candidate point is ordinarily used as a condition (hereinafter, referred to as an expanding condition) to decide the connecting property. In the prior art reference 6), in addition to the global gray-level condition, boundary information such as a local gray-level change is combined and the region growing is executed in the 3-dimensional space instead of the 2-dimensional space, thereby realizing the region extraction of a higher reliability.

In the prior art references 1) and 2), on the other hand, the editing (addition, correction, erasure, etc.) of a 3D image is discussed. In the prior art reference 1), there is described a method whereby a matrix called a mat volume in which values correspond to voxels in a one-to-one corresponding relation is used and the values are stored into a portion to be cut out and the editing is performed by the matrix calculation. In the prior art reference 2), an interactive 3-dimensional image processing system (ANALYZE) using the volume rendering method is described in detail. In the above system, a function to cut a 3-dimensional portion is also mentioned as a function to edit a 3D image.

In the above conventional techniques, any of the extracting methods of the prior art references 3) to 6) depends on the characteristics of the voxel data as an object, so that it is difficult to completely extract an interest region. In order to always obtain a clinically adequate image, the interposition of an operator is inevitable in the procedure of extraction. However, nothing is considered with respect to a point of interactive edition of image data during the extraction. On the other hand, although the edition of a 3D image is discussed in the prior art references 1) and 2), such an editing relates to an editing function for the final result and nothing is described with respect to a method where the processing procedure such as a region extraction or the like is three-dimensionally perspectively projected and displayed. In any of the above methods, consequently, the extracting process for a 3D image as an object cannot be efficiently performed.

SUMMARY OF THE INVENTION

It is an object of the invention to solve the above problems and to provide a 3-dimensional image processing method whereby an extraction procedure for a 3D image is displayed so as to be intuitively recognized and an operator is freely interposed at a portion where the extraction procedure is inadequate, and the extraction procedure is perspectively projected and displayed interactively by easy operation on the basis of an editing function.

To accomplish the above object, the following processes are executed.

(1) An extracting procedure of a 3D image is 3-dimensionally perspectively projected and displayed and monitored.

(2) The image which has been 3-dimensionally perspectively projected and displayed is ⓘ observed from an arbitrary direction, or ⓘⓘ observed in combination of the result of the extraction and a designated cross sectional image.

(3) The extracting process is interrupted at an arbitrary point in time.

(4) The processing step immediately is progressed to the step before or immediately after the present step from the time point of the interruption.

(5) The result of the extraction is edited on a 3D image after the interruption.

(6) The result of the extraction is edited on a 2D image after the interruption.

(7) The result of the editing is immediately reflected onto the 3D image.

(8) The extracting process is restarted after completion of the editing.

Each of the processes (1) to (8) has the following functions and effects.

(1) In the case of three-dimensionally executing the region growing as a connected expanding process, whether the extracting process is correctly executed or not cannot be promptly decided even when the result during the region growing is displayed as a 2D cross sectional image because the connected expanding process appears on a number of cross sectional images. As typical 3-dimensional data, $128^3$ voxel data are handled. In such a case, there are 128 cross sectional images. It is, therefore, impossible to simultaneously display those images and to decide whether or not the extraction is correct. On the other hand, by three-dimensionally perspectively projecting and displaying the result on the way of the extraction, it is sufficient to pay attention to only one image and it is possible to intuitively recognize whether or not the extraction has been correctly executed.

(2) When a 3-dimensional extracting region is observed by a 3-dimensional display, (i) even in the case where the extraction is correctly executed so long as it is seen from a certain direction, there is also a case where the extraction is improper when it is seen from another direction. It is, therefore, necessary to observe from various directions during the execution of the extracting process or in the interrupting state of the extracting process. Consequently, even in the case where the extracting process is not correctly performed, the cause can be analyzed in detail.

(ii) In the case of 3D display of extracting region, because the state of the neighboring portion of the extracting region is unknown, there is a case where the extraction has correctly been performed at a glance. To avoid such a problem, both of the result of the extraction and a cross sectional image in an arbitrary direction of the original voxel image are displayed as a combination. The boundary of the accurate region is seen together with the neighboring tissue on the cross sectional image and the extracting accuracy can be properly decided.

(3) The case where the extraction is perfectly, automatically, and correctly executed is rare. Therefore, when not only the extracting process is observed but also the automatic extracting process is interrupted, an operator can interpose and edit the data and the extraction can be efficiently performed.

(4) In the case of interrupting the process during the extraction, the process cannot always be stopped at desired time which is required by the operator. Therefore, by advancing the extraction processing step to the step immediately before or immediately after the present step, the process which has once been interrupted can be precisely controlled and the operator can reach a desired processing step.

(5) In the case where the result of the extraction which has been 3-dimensionally displayed is observed in the interrupted extraction processing step and a region is expanded into a region which must not be expanded inherently, by designating such a position on the 3D perspective projection image and by editing on the 3D image, the data can intuitively be corrected and the extraction can be efficiently performed.

(6) Similarly, in the case where the result of the extraction which has 3-dimensionally displayed is observed in the interrupted extraction processing step and a region is expanded in a region which must not be expanded inherently, by designating such a position on the 3D perspective projection image and, thereafter, by editing on the 3D cross sectional image in an arbitrary direction including the designated region, the extraction can be correctly executed.

(7) The result of the editing on the 3D or 2D display is immediately reflected to the 3D perspective projection display, so that it is possible to easily decide whether or not the result of the editing is proper.

(8) After the above editing process was executed, the interrupted extracting process is restarted and the remaining regions are automatically extracted, thereby completing the extraction. When the extraction is not properly executed, the extracting process is again interrupted and the editing process mentioned before is again performed.

DESCRIPTION OF THE PREFERRED EMBODIMENTS

An embodiment of the invention will be described hereinbelow with reference to FIGS. 1 to 8.

Figure 2:
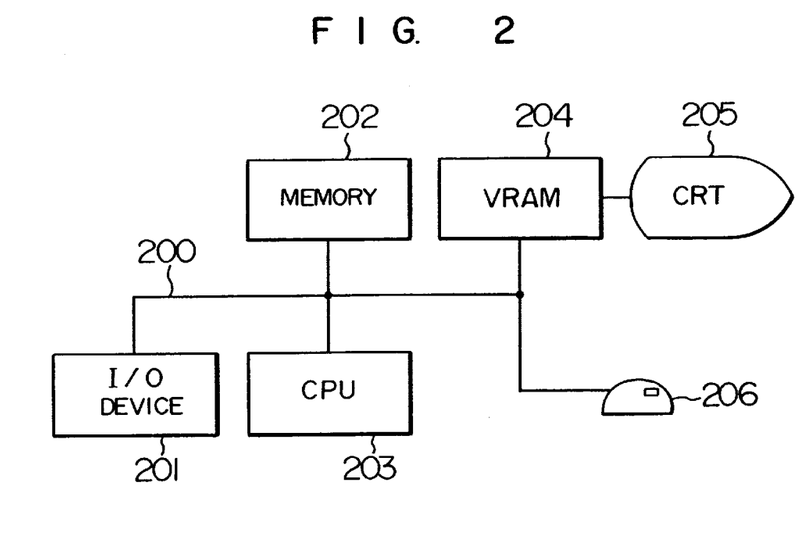
FIG. 2 shows an example of a constructional diagram of a system to which the invention is applied.

FIG. 2 is a diagram showing an example of a system construction of an apparatus to which the invention is applied.

In FIG. 2, a bus 200 is a transmission path which is used to transfer data among apparatus elements.

An I/O device 201 is a device for fetching an image signal from an external tomogram imaging apparatus such as X-ray CT, MRI, or the like and for storing into a memory 202.

The memory 202 is used as an area to store a 3-dimensional image or continuous 2-dimensional tomogram images supplied from the I/O device 201.

A CPU 203 executes an area extraction and a 3-dimensional perspective projection displaying process to the data in the memory 202 and stores the results into a VRAM 204. When the operator interrupts the extracting process on a CRT 205 by using a mouse 206, an image editing process, which will be explained hereinbelow, is executed in accordance with the input from the mouse 206.

The VRAM 204 is a display memory to store the result of the process by the CPU 203.

The CRT 205 is used for displaying the 3D perspective projection image as a result of the extraction in the VRAM 204, for indicating a 3D image editing position, and for displaying a 3D editing image.

The mouse 206 is used to indicate the editing position by moving a cursor on the CRT 205 and to indicate the timing to execute the process.

Figure 3:
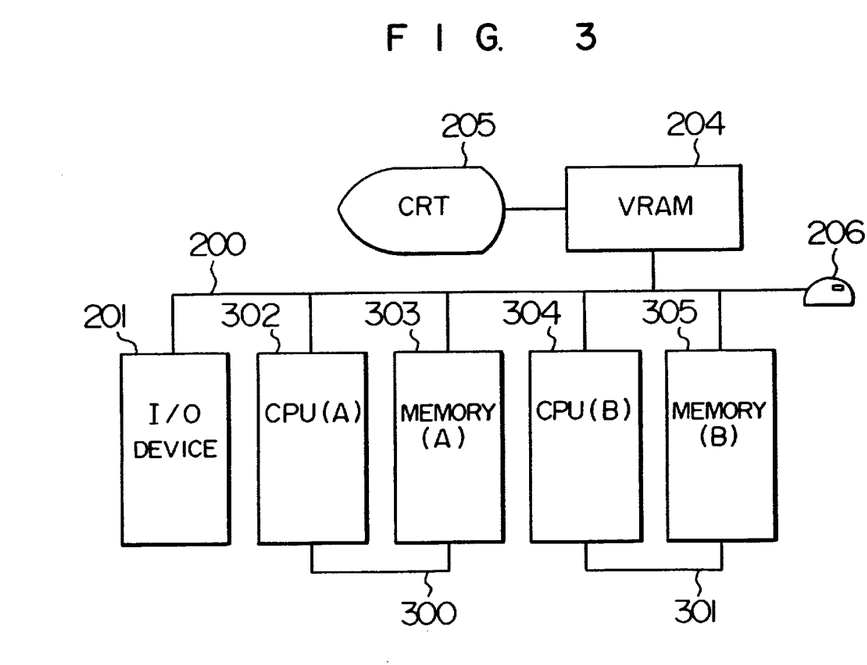
FIG. 3 shows another example of a constructional diagram of a system to which the invention is applied.

FIG. 3 is a diagram showing an example of another system construction of an apparatus to which the invention is applied. The system has a construction of multi processors in order to execute the calculating process at a high speed. Only constructing portions different from FIG. 2 will be described.

A bus 300 is a transmission path to execute a local data transfer between a CPU (A) 302 and a memory (A) 303.

A bus 301 is a transmission path to likewise perform a local data transfer between a CPU (B) 302 and a memory (B) 305.

The CPU (A) 302 executes a region extraction through the bus 300 for the data in the memory (A) 303 and performs the image editing process instructed by the mouse 206 or the like. The result is stored into the memory (A) 303. After that, the data is transferred to the memory (B) 305 through the bus 200.

The memory (A) 303 is a local memory of the CPU (A) 302 and is used to store the input and output of the results of the calculations of the CPU (A) 302.

The CPU (B) 304 executes a 3D perspective projection displaying process to the data in the memory (B) 305 through the bus 301 and stores the result into he memory (B) 305. After that, the data is transferred to the VRAM 204 through the bus 200.

The memory (B) 305 is a local memory of the CPU (B) 304 and is used to store the input and output of the results of the calculations of the CPU (B) 304.

The other component elements are substantially the same as those in FIG. 2.

Figure 1:
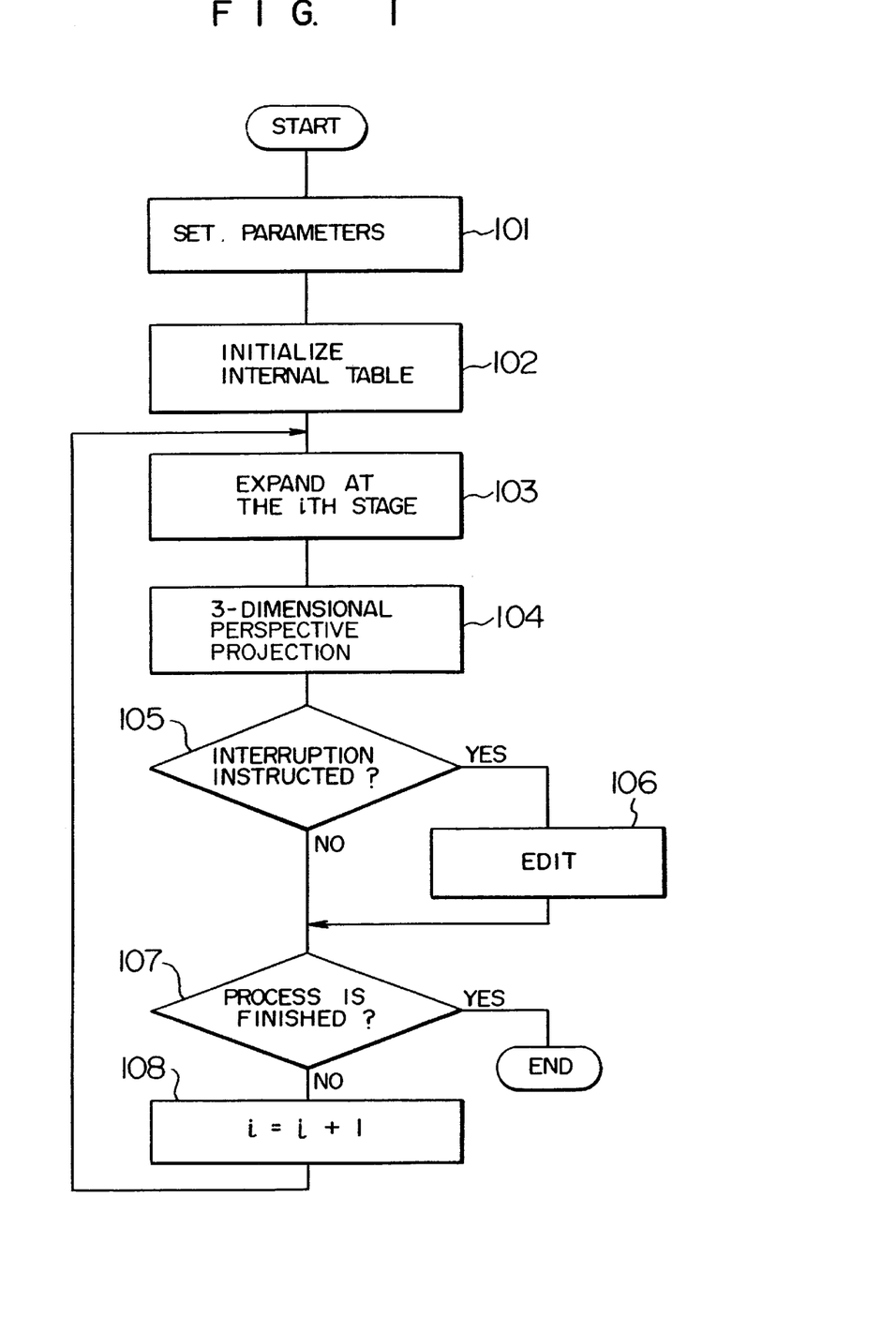
FIG. 1 is a flowchart of an embodiment of the invention.

FIG. 1 is a flowchart showing an example of a processing procedure in the CPU 203 in FIG. 2. The embodiment will now be described in accordance with the flowchart. An example in which a brain region of a head portion image obtained by using a 3-dimensional scanning method of an MRI is extracted will now be described here. The embodiment can be also obviously applied to other portions or kinds of image. The embodiment will be described here on the assumption that the 3D voxel data of the head portion scanned by the MRI has already been stored in the memory 202 through the I/O device 201.
(step 101)

Parameters necessary for an algorithm to execute a 3D extraction are set by using the mouse 206. For instance, in the case of the region expanding method based on the region growing, a start point and an expansion stop condition are set.
(step 102)

An initializing process of an internal table is performed. For instance, when a region is expanded, the start point which has been inputted in the preceding step 101 is registered into a "parent table" to store the coordinates of a voxel serving as a "parent" and a "child table" to store the coordinates of a voxel serving as a child is cleared. A region expanding step is represented by i and i is set to "1" (i=1).
(step 103)

The expanding process of the ith stage is performed. The practical process content will be described in detail hereinlater with reference to FIG. 5.
(step 104)

A 3D perspective projection process such as a volume rendering or the like is executed by using the CPU 203 for the 3-dimensional extracting region as a result on the way of the expansion stored in the memory 202. The result of the projection process is sent to the VRAM 204 and displayed on the CRT 205. An embodiment of the volume rendering will be explained hereinafter with reference to FIG. 9.
(step 105)

The CPU 203 checks to set if an instruction to interrupt the process has been inputted by the mouse 206 or not. If YES, (step 106) follows. If NO, (step 107) follows.
(step 106)

The CPU 203 examines the object of the requirement of the interruption of the process and executes the process in accordance with the object. Its content will be explained in detail hereinbelow.
(step 107)

The CPU checks to see if the expansion stop condition is satisfied or not. If YES, the extracting process is finished.
(step 108)

The CPU 203 increases the value of 1 by "1" (i=i+1). The processing routine is returned to (step 103) and the processes are repeated.

After the end of process was determined in (step 107), it is also obviously possible to add a post process and to correct the result of the extraction.

The similar processes may be also performed using a multiprocessor construction of FIG. 3. For instance, the CPU (B) 304 executes a process regarding the 3-dimensional perspective projection and the CPU (A) 302 can execute the other processes.

Figure 5:
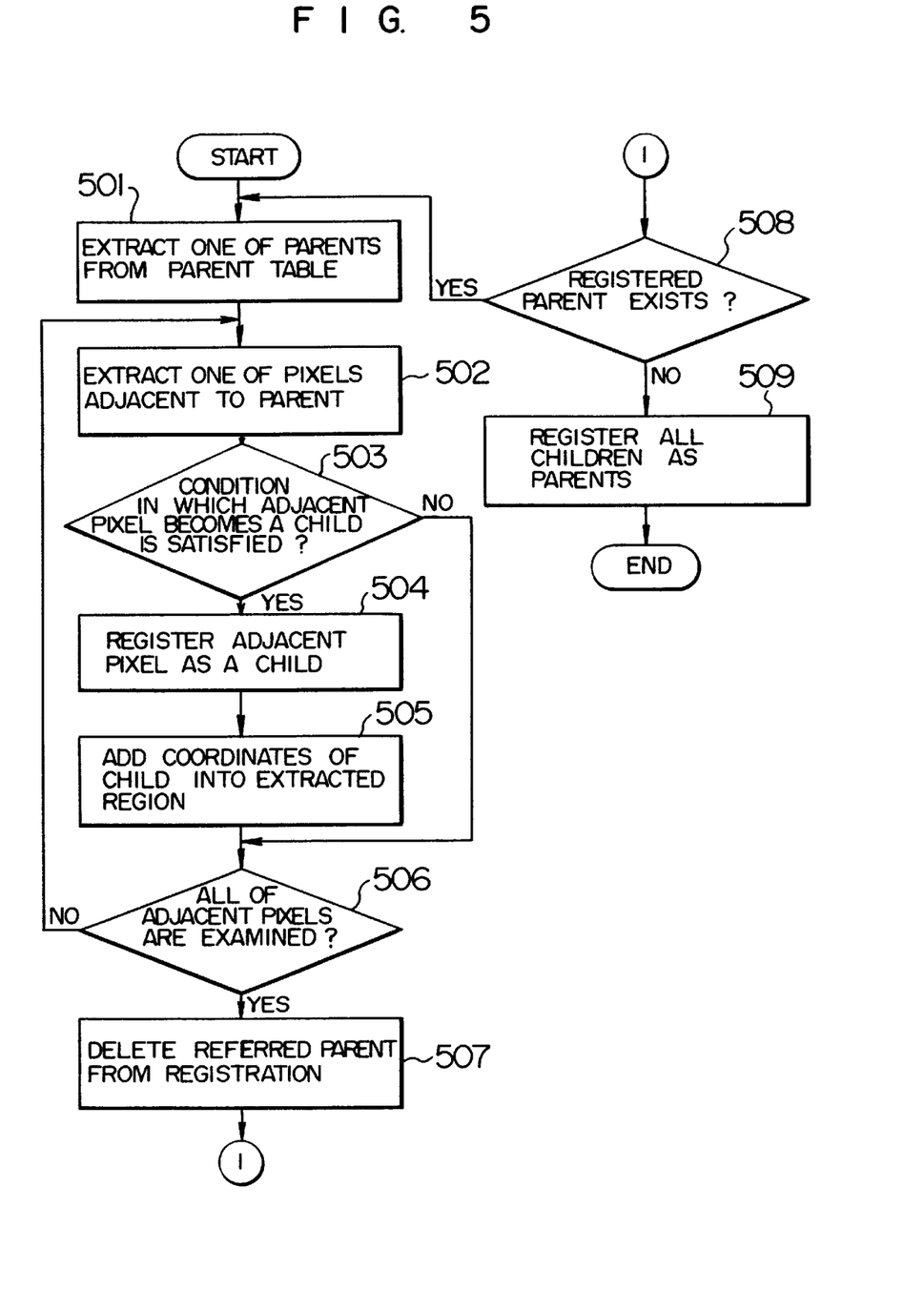
FIG. 5 shows an embodiment of a region expansion by the region growing.

The execution of the region expanding process in (step 103) will now be described with reference to a flowchart of FIG. 5.
(step 501)

One of the "parents" registered in the parent table is extracted and the following processes are performed.
(step 502)

One of the pixels adjacent to the "parent" extracted in (step 501) is extracted and the following processes are executed.
(step 503)

It is evaluated whether the "pixel adjacent to the parent" extracted in the preceding (step 502) can become a "child" or not. It is now assumed that it can become the "child" when the following conditions are satisfied.

① Such an evaluation is not performed in the past.
② The (local and global) expansion accepting conditions are satisfied.

When the adjacent pixel can become the "child", the next (step 504) follows. When it cannot become the "child", the processing routine jumps to (step 506).
(step 504)

The adjacent pixel is registered as a "child" into the "child" table.
(step 505)

The point of the "child" is written into the memory 202.
(step 506)

After completion of the evaluation regarding all of the "pixels adjacent to the parent", (step 507) follows. When the evaluation is not yet finished, the processing routine is returned to (step 502) and "another pixel adjacent to the parent" is examined.
(step 507)

The processed "parent" is erased from the "parent table".
(step 508)

A check is made to see if any other "parents" remain or not by referring to the "parent table". When any parent remains, the processing routine is returned to (step 501). When no parent remains, (step 509) follows.
(step 509)

The content in the "child table" is transferred into the "parent table". That is, all of the "children" formed are again registered as a "parent". After that, the "child table" is initialized and the processing routine is finished.

In the above embodiment, when the content indicating at which stage each region has been expanded is stored into the memory as an "expansion aging change table", an "undo process" to return the process backward can be realized. A process which effects the above feature will be explained hereinafter. When a region is designated on a 3-dimensional display image or a 2-dimensional image such as sagittal, coronal, or trans direction by using a pointing device, it is possible to indicate at which stage the designated region has been extracted.

Figure 9:
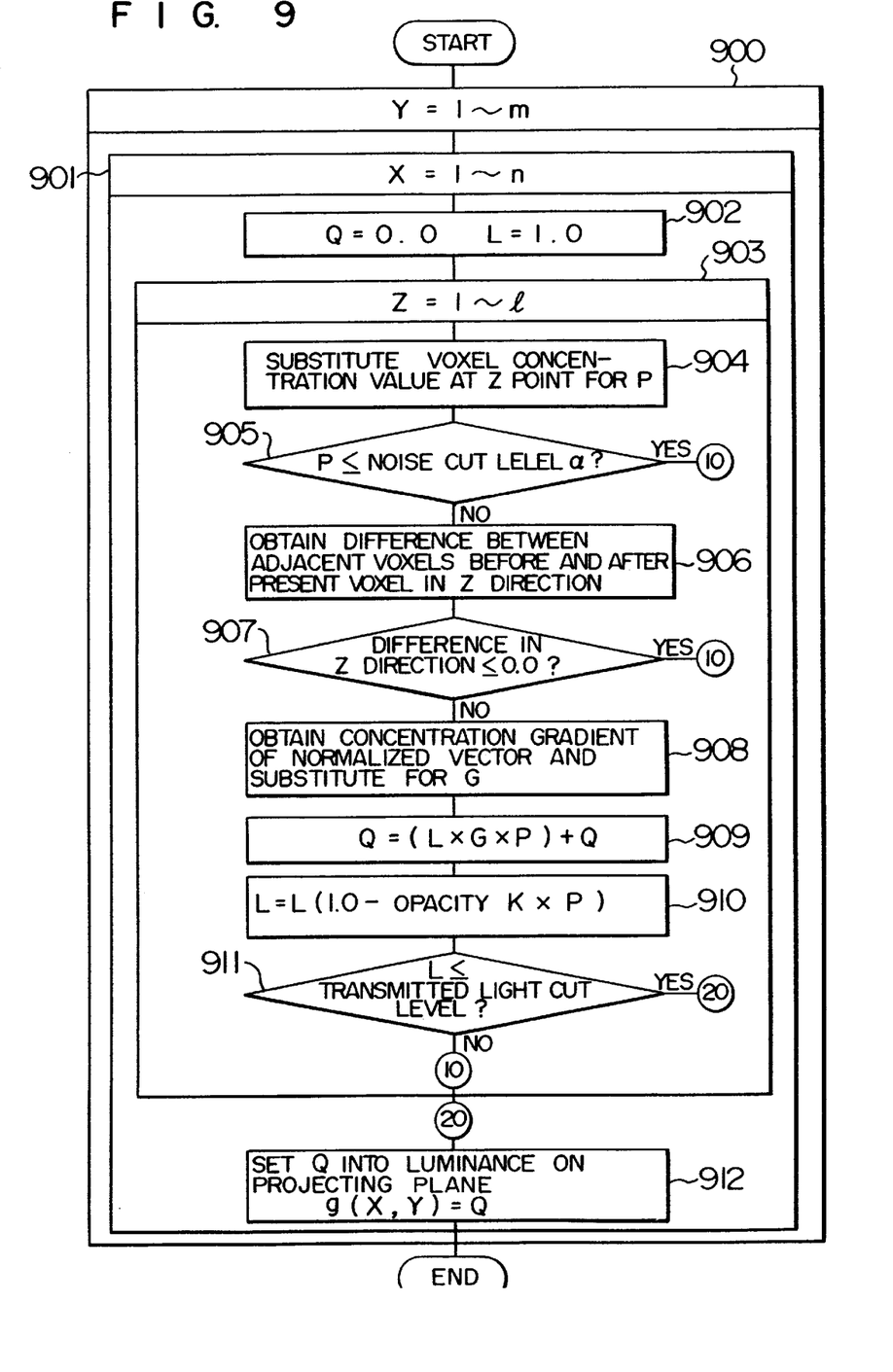
FIG. 9 is a flowchart of an embodiment for the volume rendering.

An embodiment of the volume rendering calculation in (step 104) will now be described with reference to a flowchart of FIG. 9. A size of 3-dimensional image is set to m in the x direction, n in the y direction, and $\lambda$ in the z direction, respectively.
(step 900)

The following steps are repeated in the y direction from i to m. After completion of the processes in those blocks, the whole processing routine is finished.
(step 901)

The following steps are repeated in the x direction from 1 to n. After completion of the processes in those steps, the processing routine is returned to
(step 900)
(step 902)

A work variable Q to calculate the sum of the reflected lights and a variable L of the transmitted light are initialized. Practically speaking, Q 0.0 and L=1.0.
(step 903)

The following blocks are repeated in the z direction from 1 to $\lambda$. After completion of the processes in those blocks, (step 912) follows.
(step 904)

P=f(x, y, z) is set.
(step 905)

When p is smaller than the noise cut level $\alpha$, the processing routine is returned to (step 903).

(step 906)

A difference $f(x_i, y_i, z_{i+1}) - f(x_i, y_i, z_{i-1})$ between the adjacent voxels before and after the present voxel in the z direction is obtained.

(step 907)

When the differential value is equal to or less than 0.0, the processing routine is returned to (step 903).

(step 908)

The differential value is normalized, and the resultant value assumes G.

(step 909)

The sum of the reflected lights is updated (Q=L * G * P+Q).

(step 910)

The transmitted light L is updated (L=L * (1.0−opacity K * P)).

(step 911)

When the transmitted light L is equal to or less than a predetermined transmitted light cut level, (step 903) is finished and (step 912) follows. Unless otherwise, the processing routine is returned to (step 903).

(step 912)

Q is set to the luminance on the projection surface (g(x, y)=Q). After that, the processing routine is returned to (step 901)

Several embodiments of the editing process in (step 106) will now be explained.

<Progress one stage by one>

The interruption timing in (step 105) doesn't always coincide with the will of the operator. For detailed observation, a function to progress the region expansion one stage by one is necessary. To progress the region expansion to the one-preceding stage, a state in which the interruption has been instructed is again set in (step 106) and the processing routine advances from the editing process. The processes in steps 107, 108, 103, 104, and 105 are executed. After that, the processing routine is returned to (step 106).

<Return backward one stage by one>

The operating efficiency can be fairly improved so long as the expansion region can be returned backward one stage by one in a manner similar to the case of the forward progress. To realize such a backward return, the deletion information of the parent table mentioned above is preserved, the relevant region is deleted from the extracting range on the basis of the deletion information, and the result is 3-dimensionally perspectively projected so that the "reverse process" of what is called a region expansion can be realized. To realize it, the relevant region is deleted from the extracting range on the basis of the information in the "expansion aging change table" indicating at which stage each region has been extracted as mentioned above, and the result is 3-dimensionally projected, so that the "reverse process" of what is called a voxel expansion can be realized. In the above case, it is also obviously possible to return the region backward on a unit basis of a plurality of stages instead of one stage or to directly designate the stage number.

<Edition instruction on 3-dimensional image>

In the case where the extracting region is sequentially expanded and is expanded to a region which should not inherently be expanded when those extracting regions are monitored on the 3D perspective projection image, the process is interrupted once at a point in time when such a situation is known and the operating mode is set into the editing mode is (step 106). If necessary, the expanding process is returned backward to a proper stage and is returned to the point in time when the expansion to the unnecessary region has been started. An example of the subsequent processes will now be described hereinbelow with reference to FIG. 6.

Figure 6:
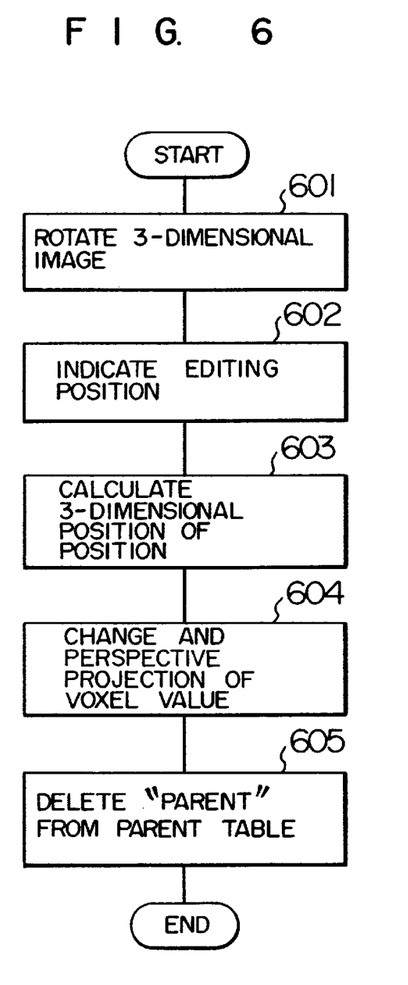
FIG. 6 is a flowchart of an embodiment to execute an editing process on a 3-dimensional image according to the invention.

(step 601)

A view point is set into a direction in which the image can be easily seen while rotating the 3D perspective projection image. Particularly speaking, the 3D image data is rotated by executing a general resampling process (nearest approximation, linear resampling, cubic convolution resampling, etc.) of the 3D image data. After that, the volume rendering is executed.

(step 602)

A position at which the improper expansion starts is indicated on the 3D perspective projection image by using the mouse 206.

(step 603)

The position on the 3-dimensional space of the surface at the indicated position is obtained. Practically speaking, the (x, y) coordinates of the voxel are decided from the coordinates of the indicated pixel. In the case of the parallel perspective projection, when the (x, y) coordinates are determined on the display, they directly become the (x, y) coordinates of the line on the voxel. The voxel values on the line are sequentially seen from the view point. The position at which the voxel value exceeds a predetermined threshold value is set to the surface position. The coordinates of such a position assume (x, y, z). In place of the above calculation, the coordinates of the surface at each position on the image can be also preserved as a table upon 3-dimensional perspective projection.

(step 604)

Values f(x, y, z) of the voxel at the above position (x, y, z) are set to values (e.g., zero) which are not used as an object for region expansion. Only such a portion is again 3-dimensionally perspective projected and displayed.

(step 605)

The relevant "parent" is deleted from the parent table.

In the above (step 604), not only the changed portion but also the whole portion can be again 3-dimensionally displayed as an object.

<Edition instruction on 2-dimensional image>

The edition instruction on a 2-dimensional image will now be described. An image can be also finely edited on the 2-dimensional image in plane of instructing the edition content on the 3-dimensional image. An example of such a process will now be described hereinbelow with reference to FIG. 7.

Figure 7:
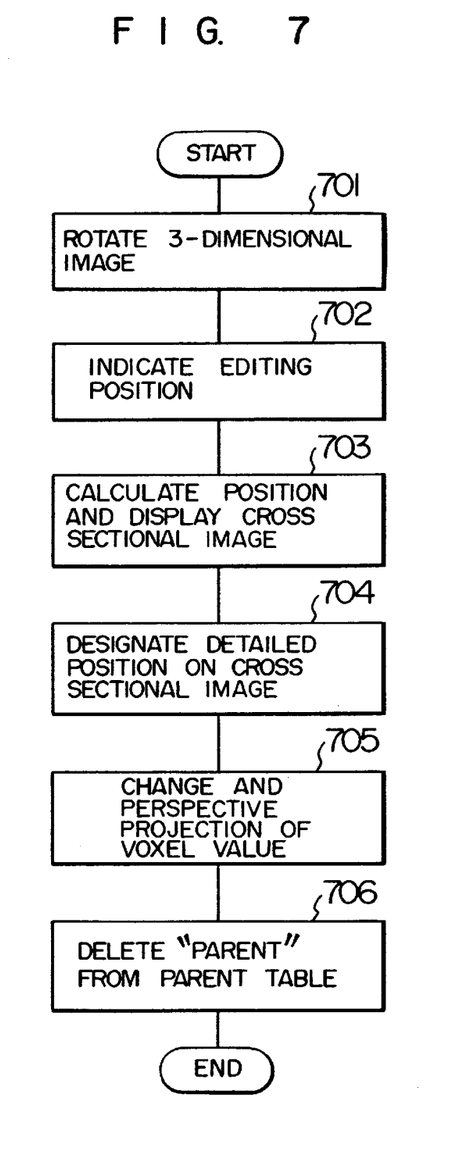
FIG. 7 is a flowchart of an embodiment to execute an editing process on a 2-dimensional image of the invention.

(steps 701 to 702)

Those steps are the same as the steps 601 to 602.

(step 703)

The position (x, y, z) on the 3-dimensional space of the surface at the indicated position is obtained in a manner similar to block 603. After that, one or all of three images in the sagittal, coronal, and trans directions including the above position is/are displayed.

(step 704)

The position (x', y', z') at which the improper expansion starts is accurately indicated on the 2-dimensional image displayed.

(step 705)

The values f(x', y', z') of the voxel at the designated position (x', y', z') are set into the value (for instance, zero) such that it doesn't become an object for region expansion. Only such a portion is again 3-dimensionally perspective projected and displayed.

(step 706)

The relevant "parent" is deleted from the parent table.

In (step 703), the cross sectional image in an arbitrary direction indicated by the operator can be also displayed.

<Synthetic display with cut surface>

Figure 8:
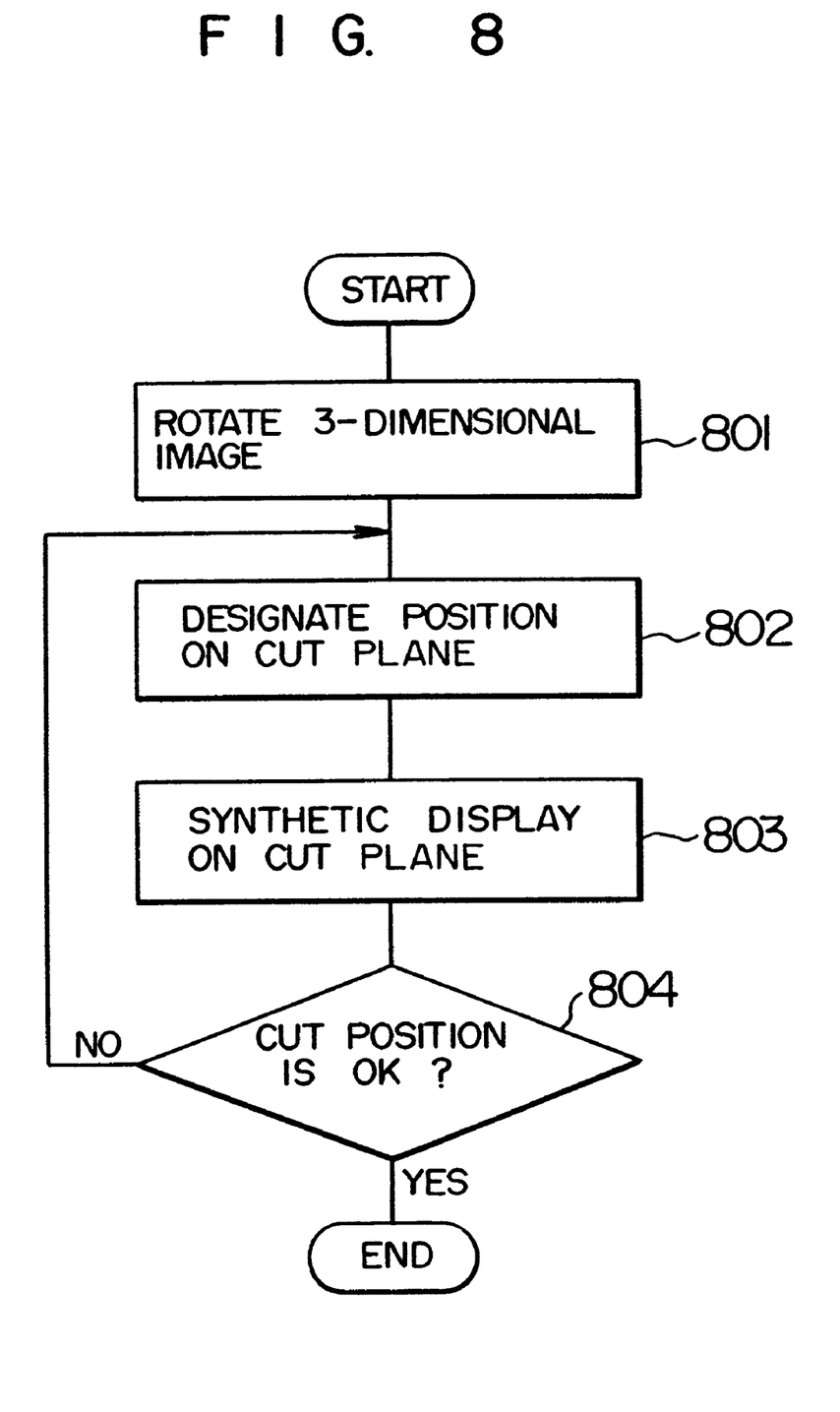
FIG. 8 is a flowchart of an embodiment to synthesize and display a cut surface and a 3-dimensional fluorescopic image.

With reference to FIG. 8, explanation will now be described with respect to an example of a process for synthesizing the cut plane and the 3D perspective projection image and for displaying the synthesized image in a manner such that whether the extracted result is proper or not can be easily determined by the 3D perspective projection image.

(step 801)

The above step is the same as the block 601.

(step 802)

The position at which the 3D image is cut by the mouse 206 is designated as a cut plane by using the mouse 206. Although there are various kinds of methods of designating the cut plane, for instance, rotational angles around the X, Y, and Z axes of the cut plane are designated, respectively.

(step 803)

New synthetic data in which the regions which have been extracted so far are set is formed with respect to the front side from the view point in which the cut surface is used as a boundary. New synthetic data in which the original 3D images are set is formed on the back side from the cut plane. By displaying the 3D perspective projection image for the synthetic data, there is executed a synthetic display such that the 3D perspective projection image of the extracted region is displayed on the front side from the cut surface as a boundary and that the cut plane of the region where it is seen without overlapping the body surface and the 3-dimensional image of the extracted region is displayed.

(step 804)

When the cut position is determined to be proper, the processing routine is finished. When it is improper, the processing routine is returned to (step 802).

In the above process, only the cut surface is displayed for the region on the back side from the cut surface and there is no need to display the body surface including the cut surface.

When a 3-dimensional internal organ is 3-dimensionally displayed, the extracting process is inevitable. However, it takes a long time according to the conventional method whereby such a process is executed an operator. On the other hand, the method of automatically executing such a process has a problem on an extracting accuracy. According to the invention, fundamentally, the automatic extraction is performed and a portion where the extraction cannot be properly executed is intuitively recognized by the 3-dimensional display, thereby enabling an operator to interpose. Consequently, the extraction can be efficiently performed while keeping a high extracting accuracy. According to the invention, further, the perspective projecting process can be executed by a local process, so that a high-speed process to edit a part of the image interactively and in a real-time manner can be performed.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method for displaying region extracting processing an image processing system to perspectively project 3-dimensional voxel data onto a 2-dimensional display, said method comprising the steps of:

executing a connected region expanding process onto 3-dimensional voxel data of an object to extract a region corresponding to a substructure of said object from said 3-dimensional voxel data, said connected region expansion process starting from a seed voxel and including automatic repetitions of an expansion substep wherein a plurality of voxels are incorporated into extracted voxels on the condition that said voxels are adjacent to previously incorporated voxels and satisfy expansion criteria;

executing 3-dimensional perspective projection process onto extracted voxels after each repetition of said expansion substep is completed to generate and renew image data for a perspective projection image successively; and displaying the perspective projection image onto the 2-dimensional display in a realtime manner simultaneously with repetitions of said expansion substep.

2. A method according to claim 1, wherein said 3-dimensional perspective projection process is executed according to an arbitrary projection direction designated by an operator.

3. A method according to claim 1, wherein said 3-dimensional perspective projection process is executed onto voxels extracted and located in one side of a cross sectional plane, and wherein said displaying step includes step for forming a combination of a perspective projection image of the extracted voxels and a cross sectional image of said object for said cross sectional plane.

4. A method for displaying region extracting processing in an image processing system to perspectively project 3-dimensional voxel data onto a 2-dimensional display, said method comprising the steps of:

executing a connected region expanding process onto 3-dimensional voxel data of an object to extract a region of the 3-dimensional voxel data corresponding to a substructure of said object from said 3-dimensional voxel data, said connected region expansion process starting from a seed voxel and including automatic repetitions of an expansion substep wherein a plurality of voxels are incorporated into extracted voxels on the condition that said voxels are adjacent to previously incorporated voxels and satisfy expansion criteria;

stopping said automatic repetitions of said expansion substep in response to an instruction input by an operator;

in response to designations input by the operator after said automatic repetitions of said expansion substep are stopped, either of expanding and reducing a region of extracted voxels;

executing 3-dimensional perspective projection process onto said extracted voxels after each repetition of said expansion substep is completed and said step of expanding or reducing is succeeded to generate and renew image data for a perspective projection image successively; and displaying the perspective projection image onto the 2-dimensional display in a realtime manner during the repetitions of said expansion substep and through said step of expanding or reducing.

5. A method according to claim 4, further including a step of starting again said automatic repetitions of said expansion substep on the basis of a expanded or reduced region.

6. A method according to claim 4, wherein said step of expanding or reducing includes going forward or backward for the repetitions of said expansion substep in increments of one substep.

7. A method according to claim 4, wherein said step of expanding or reducing includes steps of:

changing a voxel value of a voxel which is extracted during said automatic repetitions of said expansion substep and designated with a pointing device; and deleting said voxel from extracted voxels.

8. A method according to claim 4, wherein said step of expanding or reducing includes steps of:

displaying a sectional image of an extracted region comprising voxels extracted by said automatic repetitions of said expansion substep onto the 2-dimensional display;

designating a pixel of said sectional image with a pointing device;

changing a voxel value of a voxel which corresponds to the designated pixel; and deleting said voxel from extracted voxels.

9. A method for displaying region extracting processing in an image processing system to perspectively project 3-dimensional voxel data onto a 2-dimensional display, said method comprising the steps of:

executing a connected region expanding process onto 3-dimensional voxel data of an object to extract a region of the 3-dimensional voxel data corresponding to a substructure of said object from said 3-dimensional voxel data, said connected region expansion process starting from a seed voxel and including automatic repetitions of an expansion substep wherein a plurality of voxels are incorporated into extracted voxels on the condition that said voxels are adjacent to previously incorporated voxels and satisfy expansion criteria;

stopping said automatic repetitions of said expansion substep in response to an instruction input by an operator;

in response to designations input by the operator after said automatic repetitions of said expansion substep are stopped, either of expanding and reducing a region of extracted voxels, wherein said step of expanding or reducing includes steps of:

designating a repetition stage in said automatic repetitions of said expansion substep, and deleting voxels which are extracted after the designated repetition stage of said automatic repetitions of said expansion substep from extracted voxels;

executing 3-dimensional perspective projection process onto said extracted voxels after each repetition of said expansion substep is completed and said step of expanding or reducing is succeeded to generate and renew image data for a perspective projection image successively; and displaying the perspective projection image onto the 2-dimensional display in a realtime manner during the repetitions of said expansion substep and through said step of expanding or reducing.

* * * * *